United States Patent Office 3,234,237
Patented Feb. 8, 1966

3,234,237
NOVEL SUBSTITUTED TETRAHYDROTHIO-
PHENES AND THE PREPARATION THEREOF
Sheldon B. Greenbaum, Tonawanda, N.Y., assignor to Hooker Chemical Corporation, Niagara Falls, N.Y., a corporation of New York
No Drawing. Filed Nov. 2, 1961, Ser. No. 149,528
10 Claims. (Cl. 260—329)

This invention relates to substituted tetrahydrothiophenes and methods for their synthesis.

More particularly, this invention describes the preparation and some of the uses of certain substituted tetrahydrothiophenes whose structure is:

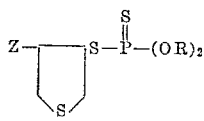

wherein Z is selected from the group consisting of hydrogen, and

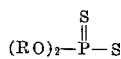

and R is alkyl, preferably lower alkyl. By lower alkyl is meant alkyl groups of five carbon atoms or less.

The novel compositions of this invention are valuable as pesticides, pesticide intermediates, and chemical intermediates generally.

Examples of the contemplated compositions of this invention include among many others, the following:

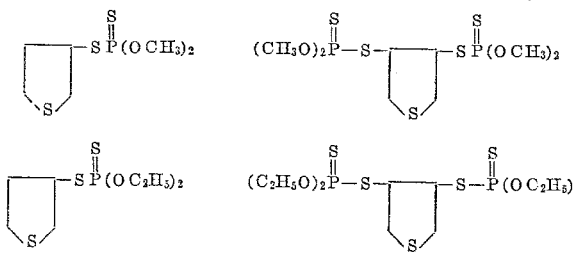

While all of the compositions encompassed by the general formula above are valuable as pesticides, pesticide intermediates, or chemical intermediates generally, as in any large group having diverse utilities, certain compositions will be more valuable than others for certain purposes. Here, the compositions wherein R is methyl or ethyl are preferred for pesticide use for reasons of exceptionally high activity, ease and low cost of preparation and availability of starting materials.

In its composition aspect the compounds of this invention offer several advantages over related compositions of the prior art. For example, the compositions of this invention are exceedingly potent insecticides, both contact and systemic, even at very low levels of concentration. In addition, these compositions have high and rapid knockdown capacity, long term persistance and relatively low mammalian toxicity.

The terms insect and insecticide as used here and throughout this application not only include the classical definition of small invertebrate animals having three clearly defined body regions, head, thorax and abdomen, with only three pair of legs, and usually with wings, such as beetles, ants, bees, flies, and the like, but also encompasses other allied classes of anthropods or pests whose members are wingless and usually have more or fewer than six legs, for example, spiders, ticks, centipedes, wood lice, nematodes and the like. Thus, as used here, the terms "insect" and "insecticide" are intended to conform the definitions provided by Section 2, sub-section h of the Federal Insecticide, Fungicide and Rodenticide Act of 1947 (Public Law 104).

While the unusual combination of high toxicity toward insects at low dosage levels, long persistence, and broad spectrum of activity toward a wide variety of insects are the salient advantages of the inventive compositons, the compositons do possess other important and valuable attributes. For examples, they may be combined with other pesticides, for examples, insecticides such as DDT, methoxychlor, lindane, aldin, endrin, DDD, BHC, parathion, malathion, methylparathion, lead arsenate, calcium arsenate, rotenone, allethrin, pyrethrum, nicotine, summer oils, dormant oils, dinitroalkylphenols, dinitrocresols, chlordane, heptachlor, chlorinated terpenes, demeton, insecticidal organophosphates, thiophosphates and dithiophosphates such as Guthion, Diazinon, Dibrom and others. It may be desirable and advantageous to combine the novel insecticide or an insecticide mixture of this invention and one or more of the above named insecticides with potentiators or synergists. Combination of the new insecticidal compositions with insecticides lacking a broad spectrum of insecticidal activity is especially advantageous. For example, in view of the strong miticidal properties of the new composition, they may be combined with insecticides weak in this respect such as $C_{10}Cl_{12}$. Similarly, these compositions having fungicidal, nematocidal, and germicidal activity may be combined with commercial insecticides deficient in this respect. In spite of this fungicidal activity, combination of the novel compositions with a good fungicide may often be advantageous especially since fungus or bacterial infections are more likely to attack plants, ornamentals, and trees already injured by insects. Thus, combinations of the novel compositions of this invention with 5-amino or 5-nitro-2,3,6-trihalophenyl-acetic acid may be efficacious toward plant diseases such as Dutch elm disease where fungi and insects are co-factors contributing to the demise of the plant.

The insecticidal composition of this invention is further advantageous in that it may be applied in a variety of forms or by any number of methods known to the art, for example, as a dust or as a liquid composition either dissolved, dispersed or emulsified. Suitable solvents include aromatic hydrocarbons such as xylene, methylnaphthalenes, and trimethylbenzenes, ketones such as isophorone, chlorocarbons such as chlorobenzene, and other organic solvents. Whether dissolved or dispersed in a solvent or formulated as wettable powder, the insecticide of this invention may contain as a conditioning agent one or more modifiers, conditioning agents, wetting agents, dispersing agents, emulsifying agents, surface active agents, the term adjuvants being used herein to generically represent substances which facilitate formulation, handling and application of the insecticide. In addition, said adjuvants frequently enhance insecticidal effectiveness. A satisfactory but not exhaustive list of these substances appears among other places in "Soap and Chemical Specialties," vol. 31, No. 7, pages 50 to 61; No. 8, pages 48 to 61; No. 9, pages 52 to 67 and No. 10, pages 38 to 67 (1955). Also see Bulletin E–607 of the Bureau of Entomology and Plant Quarantine of the United States Department of Agriculture.

Where convenient or desired, the novel insecticides of this invention may be made up as a solid formulation, with or without adjuvants to be applied as a dust, wettable powder, pellet, or granule. Suitable solid carriers which may be used to dilute, admix, or modify the physical characteristics of the insecticide include, generally, any inert solid material. Illustrative examples of these solid carriers include but are not limited to talcs, clays, flours, silica, alkaline earth carbonates, oxides, phosphates, sulfur and the like. To prevent decomposition of the solid formulations, a substance such as a weak base may be added to destroy any adverse catalytic activity of the solid carrier.

Another important advantage of this insecticide is that it is toxic both through systemic and application offering two separate means of controlling the insects.

In its process aspects this invention described the preparation of the inventive compositions through the condensation of a 2,5-dihydrothiophene, and a dilower alkyl phosphorodithioate or the disulfide of the latter compound as shown below:

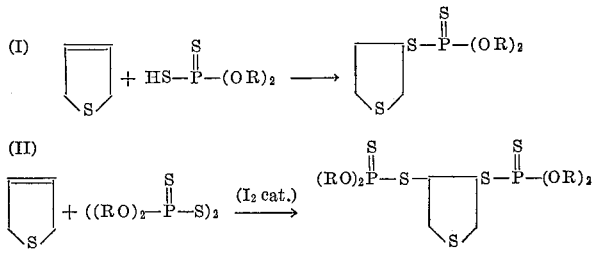

wherein R is as described before.

As indicated above, the nature of the radical R is not critical to the workability of the inventive process, except that with increasing chain length the insecticidal activity of the product becomes diminished.

The inventive process is distinguished by the complete flexibility and non-criticality of process conditions. That is, for example, the reaction may be carried out by adding either reactant to the other reactant dissolved in an unreactive solvent. By unreactive solvent is meant a solvent which does not take part in the reaction at all and may be recovered from the reaction mixture by any recovery or isolation procedure such as distillation, centrifugation, decantation, and the like. Examples of suitable unreactive solvents include but are not limited to alkanes, aliphatic alcohols, ketones, esters, aromatic hydrocarbons and chlorinated aromatic hydrocarbons having the desired solubility characteristics.

The temperature conditions employed in carrying out the reactions of this invention are not critical. While superior yields are obtained when the reaction is carried out near the reflux temperature of the solvent, high or lower temperatures may be employed. Normally, the reactions are effected at atmospheric pressure but similar results may be obtained by working in closed system or at sub-atmospheric pressures. The products are recovered from their reaction mixtures and purified by conventional techniques, such as extraction, evaporation, decantation, crystallization and/or depending upon the physical state of the products and the equipment available. While no catalyst is required where the disulfide is used as the reactant a small amount of iodine is added to speed up the reaction and the external cooling is used to prevent the reaction from "running away." The Reaction I above is most conveniently carried out by adding the dihydrothiophene to a solution of the dilower-alkyl phosphorothiolothionate at or near the reflux temperature of the solvent. When the disulfide is employed as the reactant (Reactant II above), a small amount of iodine is added to the reaction mixture and external cooling is employed during the earlier more exothermic stages of the condensation. After the reaction is complete, the reaction mixture has been decomposed with dilute aqueous alkali or sodium thiosulfate, as appropriate to remove or destroy unreacted sulfur acids and iodine, the product is separated or extracted by means of an organic solvent, the solvent recovered by evaporation, and the product purified by fractional distillation.

An alternate process approach is to add the dilower-alkyl phosphorothiolothionate or its disulfide to a 1,4-dichloro-2-butene in the same general manner as they would be added to a 2,5-dihydrothiophene. The intermediate 2- or 2,3-bis-(dilower-alkyl phosphorothiolothionate) is then cyclized to a tetrahydrothiophene compound of this invention by treatment with at least one molar equivalent of a metal sulfide preferably an alkali metal sulfide such as sodium sulfide, in a solvent such as the reaction solvents descrived above. The product is worked up as described previously.

Our invention is further illustrated by the following non-limiting examples:

*Example 1.—Preparation of O,O-diethyl S-(tetrahydro-3-thienyl) phosphorothiolothionate*

A solution of 0.5 mole of diethyl phosphorothiolothionate in two hundred and twenty-two milliliters of toluene kept at eighty to ninety degrees centigrade is treated dropwise with 0.55 mole of 2,5-dihydrothiophene. After heating the reaction mixture overnight under reflux, a determination of the residual acidity with standard alkali showed that ninety-three percent reaction had occurred. The reaction mixture is washed once with forty-three milliliters of 1 N alkali and three times with water. The organic layer is dried over anhydrous magnesium sulfate and freed of solvent and unreacted starting materials by heating under reduced pressure. An 87.6 gram portion of O,O-diethyl S-(tetrahydro-3-thienyl) phosphorothiolothionate is obtained. Distillation gave a yellow oil, boiling point eight to eighty-two degrees/.02 mm.

*Analysis.*—Calcd. for $C_8H_{17}O_2PS_3$: P, 11.4 percent; S, 35.5 percent. Found: P, 11.5 percent; S, 35.8 percent.

*Example 2.—Preparation of O,O-dimethyl S-(tetrahydro-3-thienyl) phosphorothiolothionate*

To a solution of 0.25 mole of O,O-dimethyl phosphorothiolothionate in ninety milliliters of toluene kept at eighty to ninety degrees centigrade, is added dropwise 0.275 mole of 2,5-dihydrothiophene. After an additional twelve hours of heating under reflux, a determination of the residual acidity indicated ninety-seven percent reaction. The reaction mixture is washed once with 6.7 milliliters of 1 N alkali and then three times with water. The toluene solution containing the product is dried and freed of solvent and unreacted starting materials as before yielding twenty-three grams of O,O-dimethyl S-(tetrahydro-3-thienyl)phosphorothiolothionate as a yellow oil. Distillation gave a product boiling point fifty to fifty-five degrees centigrade 0.02 mm.

*Analysis.*—Calcd. for $C_6H_{13}O_2PS_3$: P, 12.7 percent; S, 39.6 percent. Found: P, 12.4 percent; S, 39.9 percent.

*Example 3.—O,O-diisopropyl S-(tetrahydro-3-thienyl) phosphorothiolothionate*

An 0.33 mole portion of 2,5-dihydrothiophene is added dropwise to two hundred and fifty-eight milliliters of toluene containing 0.33 mole of O,O-diisopropyl phosphorothiolothionate kept at eighty degrees centigrade. After heating under reflux for ten hours, a determination of the residual acidity with standard alkali showed 86.2 percent reaction. The reaction mixture is washed first with 46.2 milliliters of 1 N alkali and then washed three times with water. The solution is dried over anhydrous magnesium sulfate and freed of solvent and unreacted starting materials as in Example 1. A yield of seventy-four grams of O,O-diisopropyl S-(tetrahydro-3-thienyl) phosphorothiolothionate as a yellow oil is obtained.

*Analysis.*—Calcd. for $C_{10}H_{21}O_2PS_3$: P, 10.3 percent; S, 32.1 percent. Found: P, 10.6 percent; S, 32.0 percent.

*Example 4.—O,O-diethyl S-(1,4-dichloro-2-butyl)phosphorothiolothionate*

A 23.6 grams portion of cis or trans-1,4-dichloro-2-butene is added dropwise to a stirred solution of 0.19 mole of O,O-diethyl phosphorothiolothionate and eighty milliliters of toluene kept at room temperature. After the reaction mixture is heated at ninety-five degrees centigrade for one hour, and then at one hundred and twenty-seven degrees centigrade for six hours, a determination of the residual acidity with standard alkali indicated seventy-seven percent reaction. The reaction mixture is washed first with 47.7 milliliters of 1 N alkali and then washed three times with water. The toluene solution containing the product is dried over anhydrous magnesium sulfate, and free of solvent and unreacted starting materials as before, yielding O,O-diethyl S-(1,4-dichloro-2-butyl) phosphorothiolothionate as a yellow oil.

*Analysis.*—Calcd. for $C_8H_{17}Cl_2O_2PS_2$: Cl, 22.9 percent. Found: Cl, 23.3 percent.

*Example 5.—Alternate preparation of O,O-diethyl(tetrahydro-3-thienyl) phosphorothiolothionate*

A 15.5 grams portion of O,O-diethyl S-(1,4-dichloro-2-butyl)phosphorothiolothionate (the product of Example 4), is dissolved in fifty milliliters of alcohol and cyclized with a mixture of 6.5 grams of sodium sulfide, twenty milliliters of alcohol and twenty milliliters of water. After an hour a small amount of an oil separated out. The alcoholic supernatant layer is dissolved in benzene, washed with sodium bicarbonate solution, and then with water. After drying over anydrous magnesium sulfate and removing the solvent under reduced pressure, there remained an oil which infrared analysis and paper chromatography demonstrated to be identical with the product of Example 1.

*Example 6.—Preparation of 3,4-bis-(diethoxyphosphinothioylthio)tetrahydrothiophene*

A mixture of thirty-seven grams of O,O-diethyl phosphorothiolothionate disulfide, 2.3 grams of crushed iodine and 8.6 grams of 2,5-dihydrothiophene are stirred together maintaining the temperature of the reaction mixture at sixty degrees centigrade during the exothermic reaction period and then heating to reflux. The reaction mixture is cooled and extracted with two hundred and fifty milliliters of benzene. The benzene extract is washed with the following solutions in the order indicated: fifteen percent aqueous sodium chloride, dilute aqueous sodium thiosulfate, and the sodium chloride solution again. After drying over magnesium sulfate, removal of the solvent yielded 18.5 grams of 3,4-bis(diethoxyphosphinothioylthio)tetrahydrothiophene as a yellow oil.

*Analysis.*—Calcd. for $C_{12}H_{26}O_4P_2S_5$: P, 13.6 percent; S, 35.0 percent. Found: P, 13.4 percent; S, 34.8 percent.

The compositions of this invention, including the intermediate chloro compounds, are potent insecticides when evaluated in standard tests using recognized apparatus and controls. The following examples illustrate typical formulations of the compositions of this invention as emulsions, granules, and dusts. All parts indicated are by weight.

*Example 7.—Formulation of an Emulsion*

| Components: | Parts by weight |
|---|---|
| O,O-diethyl S-(tetrahydro-3-thienyl) phosphorothioate | 2 |
| Surface active agent (Triton X 100) | 1 |
| Xylene | 1 |

The components are blended to obtain a solution emulsifiable with water.

*Example 8.—Another emulsion formulation*

| Components: | Parts by weight |
|---|---|
| O,O-diethyl S-(tetrahydro-3-thienyl) phosphorothioate | 40 |
| Surface active agent (Atlox 3335) | 3 |
| Surface active agent (Atlox 8910) | 1 |
| Xylene | 135 |

The components are blended to make a solution emulsifiable with water.

*Example 9.—Formulation of a granule composition*

| Components: | Parts by weight |
|---|---|
| O,O-diethyl S-(tetrahydro-3-thienyl) phosphorothioate | 2 |
| Attapulgus clay 30/60 mesh | 17 |
| Urea(deactivator to prevent breakdown of ester) | 1 |

*Example 10.—Formulation of a carbon-based dust*

| Component: | Part by weight |
|---|---|
| Activated carbon | 90 |
| O,O-diethyl S-(1,4-dichloro-2-butyl) phosphorothiolothionate | 10 |

The components are blended to make a powder which adheres readily to seeds and may be used as a seed dressing.

The following is a summary of the test procedure used to evaluate the efficacy of the composition as insecticides.

*Systemic insecticidal tests.*—Twenty milliliters of 0.01 percent concentration of the sample chemical is applied to the vermiculite substratum of potted plants. Forty-eight hours after application the plants are infested with ten adult insects and mortality determination is made after five days.

*Pea aphid.*—Adult pea aphids are sprayed and transferred to sprayed pea plants and held for forty-eight hour mortality determinations. Foliage injury, if any, is recorded.

*Spider mite.*—Lima bean plants are infested with fifty to one hundred adults of the strawberry spider mite, *Tetranychus atlanticus*, prior to testing. The infested plants are dipped into the test material, removed and held for five days. Adult mortality as well as ovicidal action is noted.

*Example 11.—Systemic insecticidal evaluation of representative compositions of this invention*

| Compound Tested | Test Insect, Concentration and Percent Kill | | | | |
|---|---|---|---|---|---|
| | *Macrosiphum pisi* (Pea Aphid) | | | *Tetranychus atlanticus* (StrawberrySpiderMite) | |
| | At 0.1% | At 0.05% | At 0.005% | At 0.05% | At 0.005% |
| O,O-dimethyl S-(tetrahydro-3-thienyl) phosphorothiolothionate | 100 | 100 | 100 | 100 | 100 |
| O,O-diethyl S-(tetrahydro-3-thienyl) phosphorothiolothionate | 100 | 100 | 100 | 100 | 100 |
| O,O-diisopropyl S-(tetrahydro-3-thienyl) phosphorothiolothionate | 100 | 20 | | 0 | |

*Example 12.*—*Contact insecticidal evaluation, etc.*

| | Test Insect—Concentration and Percent Kill | | | |
|---|---|---|---|---|
| | *Macrosiphum pisi* (Pea Aphid) | | *Tetranychus atlanticus* (Strawberry Spider Mite) | |
| | At 0.1% | At .01% | At .1% | At .01% |
| O,O-dimethyl S-(tetrahydro-3-thienyl) phosphorothiolothionate | 100 | 100 | 100 | 100 |
| O,O-diethyl S-tetrahydro-3-thienyl) phosphorothiolothionate | 100 | 100 | 100 | 75 |
| 3,4-bis(diethoxyphosphinothioylthio)tetrahydrothiophene | 100 | 100 | 100 | 100 |
| O,O-diisopropyl S-(tetrahydro-3-thienyl) phosphorothiolothionate | 100 | 20 | 100 | |

Except as set forth in the claims which follow, none of the examples above are to be construed as limitations of the inventive concepts or practices.

I claim:

1. A compound of the formula:

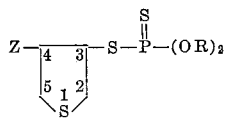

wherein Z is selected from the group consisting of hydrogen and

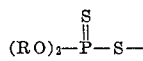

and R is lower alkyl.

2. A compound of the formula

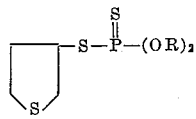

wherein R is lower alkyl.

3. O,O-dimethyl S-(tetrahydro-3-thienyl) phosphorothiolothionate.

4. O,O-diethyl S-(tetrahydro-3-thienyl) phosphorothiolothionate.

5. O,O-diisopropyl S-(tetrahydro-3-thienyl) phosphorothiolothionate.

6. 3,4-bis-(diethoxy phosphinothiolothio)tetrahydrothiophene.

7. 3,4-bis(dimethoxy phosphinothiolthio) tetrahydrothrophene.

8. A process for preparing a compound of the formula

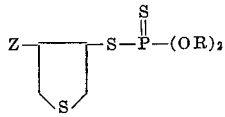

wherein Z is selected from the group consisting of hydrogen and

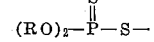

and R is lower alkyl, comprising condensing a dialkyl phosphorothiolothionate of the structure

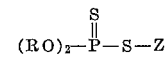

with 3,5-dihydrothiophene.

9. A process for preparing a compound of the formula

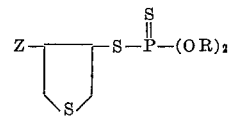

wherein Z is selected from the group consisting of hydrogen and

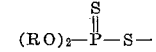

and R is lower alkyl, comprising condensing

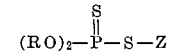

with 1,4-dichloro-2-butene and contacting the resultant 2-(dialkyl phosphorothiolothionate) - 1,4 - dichlorobutane with at least one molar equivalent of a metal sulfide.

10. A process for preparing a compound of the formula

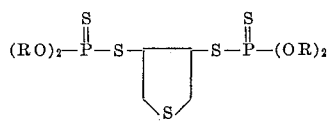

wherein R is lower alkyl, comprising condensing

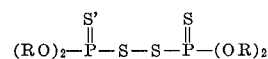

with 2,5-dihydrothiophene.

References Cited by the Examiner

UNITED STATES PATENTS 2,769,013 10/1956 Lowenstein-Lom ___ 260—332.3
2,882,278 4/1959 McConnell et al. ___ 260—332.1

FOREIGN PATENTS 819,169 8/1959 Great Britain.

OTHER REFERENCES

Hartough, Thiopene and Its Derivatives, 1952, Interscience Publishers, Inc., New York, N.Y., page 76.

WALTER A. MODANCE, *Primary Examiner.*

D. McCUTCHEN, *Examiner.*

JOHN T. MILLER, JAMES A. PATTEN,
*Assistant Examiners.*